United States Patent [19]
DeGroot

[11] Patent Number: 4,683,547
[45] Date of Patent: Jul. 28, 1987

[54] SPECIAL ACCUMULATE INSTRUCTION FOR MULTIPLE FLOATING POINT ARITHMETIC UNITS WHICH USE A PUTAWAY BUS TO ENHANCE PERFORMANCE

[75] Inventor: Richard D. DeGroot, Yorktown Heights, N.Y.

[73] Assignee: International Business Machines Corporation, Armonk, N.Y.

[21] Appl. No.: 664,739

[22] Filed: Oct. 25, 1984

[51] Int. Cl.$^4$ .............................................. G06F 7/38
[52] U.S. Cl. ................................................... 364/748
[58] Field of Search ............... 364/748, 758, 754, 736, 364/759, 768, 784

[56] References Cited

U.S. PATENT DOCUMENTS

| | | | |
|---|---|---|---|
| 3,697,734 | 10/1972 | Booth et al. | 364/748 |
| 4,075,704 | 2/1978 | O'Leary | 364/748 |
| 4,407,018 | 9/1983 | Kanemasa | 364/736 |
| 4,435,765 | 3/1984 | Uchida et al. | 364/736 X |
| 4,438,488 | 3/1984 | Shibayama et al. | 364/736 |
| 4,490,807 | 12/1984 | Chevillat et al. | 364/736 |

FOREIGN PATENT DOCUMENTS

| | | | |
|---|---|---|---|
| 0171595 | 2/1986 | European Pat. Off. | 364/748 |
| 0099540 | 6/1984 | Japan | 364/748 |

OTHER PUBLICATIONS

R. M. Tomasulo, "*An Efficient Algorithm for Exploiting Multiple Arithmetic Units,*" IBM Journal, Jan. 1967, pp. 25–33.

Sofer et al., "*Parallel Pipeline Organization of Execution Unit*", IBM Technical Disclosure Bulletin, vol. 14, No. 10, Mar. 1972, pp. 2930–2933.

Strelchun, *Array Processor Responds in Real Time*, Electronics, Aug. 1979, pp. 118–124.

Wittmayer, *Array Processor with High Computing Power*, Elektronik, vol. 28, No. 25, pp. 58–62, Dec. 13, 1979.

Bernhard, *Giants in Small Packages*, Application Computers, pp. 39–44, IEEE Spectrum, Feb. 1982.

*Primary Examiner*—Archie E. Williams, Jr.
*Assistant Examiner*—Long T. Nguyen
*Attorney, Agent, or Firm*—Jack M. Arnold

[57] ABSTRACT

A data processing system includes a multiple floating point arithmetic unit with a putaway and a bypass bus, which includes a new instruction for handling multiple multiply or divide instructions. These instructions are separated by add operations, including passing the results of each multiply/divide operation on a bypass bus to the input of an adder along with the inputs from an accumulate bypass bus which is the output from the adder for an automatic add operation on an accumulate multiply or accumulate divide operation. This allows two floating point results to be produced each cycle, one of which can be accumulated without any intervening control by the central decoder. The accumulation is performed under distributed control of the accumulator logic itself.

9 Claims, 3 Drawing Figures

SPECIAL ACCUMULATE INSTRUCTION FOR MULTIPLE FLOATING POINT ARITHMETIC UNITS WHICH USE A PUTAWAY BUS TO ENHANCE PERFORMANCE

DESCRIPTION

1. Technical Field

The invention is in the field of arithmetic units for computing systems, and in particular is directed to floating point arithmetic units.

2. Background Art

Many computer programs are characterized as having a large number of floating point arithmetic operations. As a consequence, a large number of the instructions executed by the machine are floating-point instructions (floating add, floating subtract, floating multiply, floating compare, etc.). For such programs, the greater the number of floating-point arithmetic instructions that can be executed per cycle, the faster the machine speed of operation. Arithmetic results produced by the floating-point arithmetic unit must be saved, in a register-file, for instance, for later use and for eventual storage into memory. Although many designs for arithmetic units allow multiple arithmetic operations to be in execution at once, most allow only one actual result be produced each cycle.

The IBM model 360/91 is an example of a machine with multiple floating point arithmetic units. As arithmetic results exit from one of the arithmetic units, they are placed on a putaway (result) bus where they travel to the register file and enter a predetermined register for which they are destined. In addition, the results travel along a special bypass bus which is connected to the waiting stages associated with each arithmetic unit. If any instruction in a waiting stage is waiting for the newly produced result, the result is entered into one of the buffers in the waiting stations. In this way, performance is increased by not requiring waiting instructions to wait while the needed result is first gated into the register file and then gated from the register file into the waiting station. A complete description of this scheme may be found in "An Efficient Algorithm for Exploiting Multiple Arithmetic Units" by R. M. Tomasulo, IBM Journal, January 1967, pp. 25-33. Since there is only one putaway bus and one bypass in the Tomasulo scheme, only one floating point result may be produced each cycle.

U.S. Pat. No. 4,075,704 to O'Leary describes a floating point data processor for high speed operation, which includes two arithmetic units and two putaway busses. Both busses pass back to both arithmetic units. However, each bus enters only one side of each arithmetic unit.

Although the drawings in O'Leary illustrate multiple entries into each side of the arithmetic unit, these are controlled by the decoder (central control). Thus, O'Leary's scheme allows only a single data item, that is a result, to enter a given side of the pipeline during any cycle, and O'Leary's scheme requires central control.

U.S. Pat. No. 3,697,734 to Booth et al sets forth a digital computer utilizing a plurality of parallel asynchronous arithmetic units, which include a bussing scheme similar to O'Leary, in that only one arithmetic result is produced each cycle.

IBM Technical Disclosure Bulletin, Vol. 14, No. 10, March 1972, pp. 2930-2933 in an article by Sofa et al sets forth a floating point arithmetic scheme in which a single arithmetic result is allowed onto the pipeline during each cycle.

In an article by Ramamoorthy in "Computing Surveys", Vol. 9, No. 1, March 1977, pp. 61-85, various schemes are set forth for making floating point arithmetic operations, with each of the schemes allowing only one arithmetic result to enter the pipeline during each cycle.

According to the present invention, a floating point arithmetic unit is described which allows two floating point results to be produced each cycle, one of which can be accumulated without any intervening control by the central decoder, and in which the accumulation is performed under distributed control of the accumulator logic itself.

DISCLOSURE OF THE INVENTION

Figure 1:
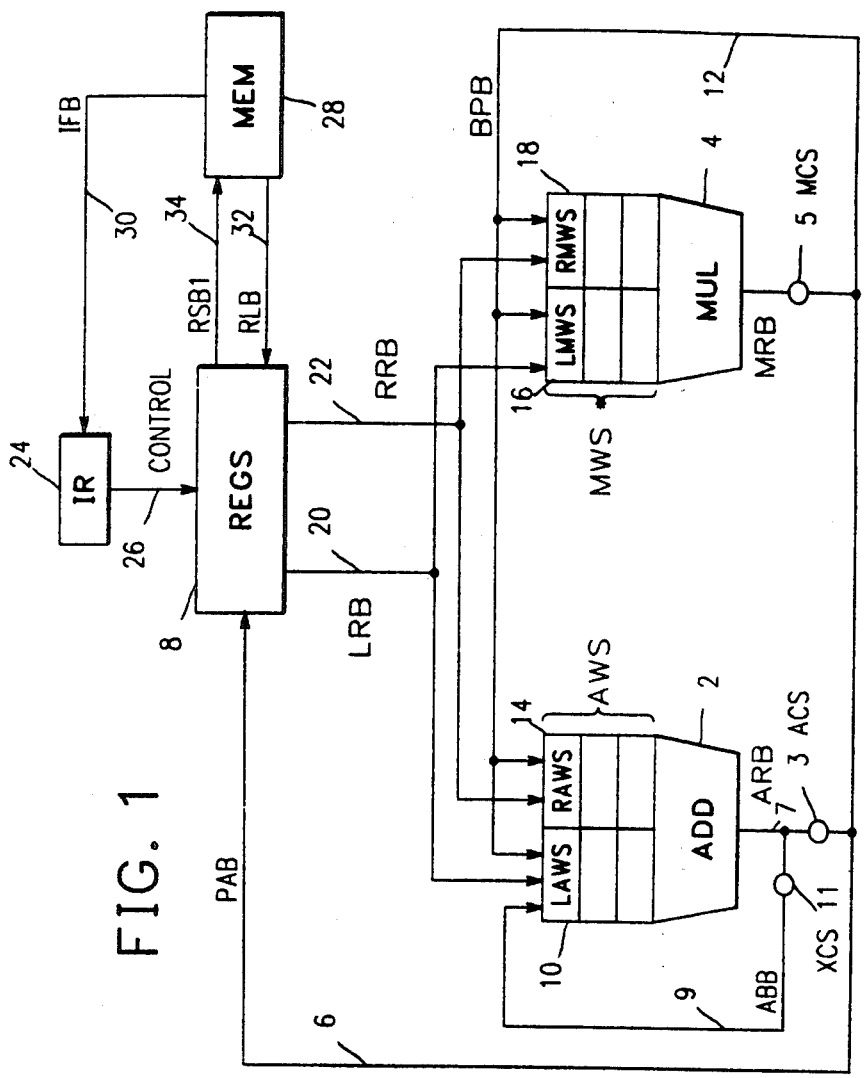
FIG. 1 is a block diagram representation of a floating point arithmetic unit according to the present invention.

A data processing system is disclosed, which includes a multiple floating point arithmetic unit with a putaway and a bypass bus, which includes a new instruction for handling multiple multiply or divide instructions. These instructions include passing the results of each multiply/divide operation on a bypass bus to the input of an adder along with the inputs from an accumulate bypass bus which is the output from the adder for an automatic add operation on an accumulate multiply or accumulate divide operation. This allows two floating point results to be produced each cycle, one of which can be accumulated without any intervening control by the central decoder. The accumulation is performed under distributed control of the accumulator logic itself.

BEST MODE OF CARRYING OUT THE INVENTION

A mechanism is described for use within the arithmetic unit of a high-speed digital computer. The purpose of the mechanism is to allow for the rapid, efficient accumulation of partial arithmetic results into a single accumulating register. Such operations are commonly and frequently used in programs performing complex arithmetic operations on vectors and matrices. Because these operations involve the accumulation of partial results, a typical sequence of actions might be "operate", "accumulate", "operate", "accumulate", and so on. Since each step of the sequence is usually controlled by a separate machine instruction, maximum machine speeds are usually one step per machine cycle. Consequently, if for example eight partial results are to be created and accumulated, 16 machine cycles would be required. Vector machines use a special vector arithmetic unit to reduce the total cycle time to the number of operations performed, with the accumulations occurring in parallel. Thus 8 partial results can be accumulated in 8 machine cycles as opposed to 16 on non-vector machines. But vector units are expensive and are separate mechanisms from those normally found in computer units. This invention describes a means of reducing the total cycle time with the use of a conventional-type arithmetic unit. Only minimal additional hardware is required, and thus the performance increase is obtained at minimal cost.

Consider two vectors of size N called A and B. To compute the inner product of A and B, the following FORTRAN code would suffice:

IP=0
DO 5 J=1,N
IP=IP+(A(J) * B(J))
5 CONTINUE

Clearly N multiplications and N additions are required. The existence of at least two separate, independent pipelined arithmetic units, one of which will typically perform additions and subtractions and the other performing multiplications and divisions is assumed. In such organizations, one result can be produced each cycle by either of the two units. However, usually only one of the units is allowed to produce a result during any given cycle since only one result can be stored away each cycle. In this invention, under special circumstances, two results will be allowed in some cycles; one of these will be a partially accumulated result.

When the above FORTRAN code is executed, a sequence of machine instructions similar to the following is executed:

MUL R1,A(1) * B(1)
ADD R2,R2+R1
MUL R1,A(2) * B(2)
ADD R2,R2+R1
etc.

It can be seen that each multiply instruction must wait on the preceding multiply instruction to finish since each uses register R1 to form a product. One product must be produced by the multiplier unit and sent to the adder before a second product can be formed in the same register. Similarly, each add instruction must wait on the preceding add instruction to finish since each uses the partial sum in register R2 to compute the next partial sum. If both pipelines are four stages in length, each stage requiring one machine cycle, then one multiply and one add can be executed every four cycles. For a vector length of N then, 4N cycles might be required to compute the inner product.

To overcome this inadequate performance, optimizing compilers perform a transformation on the code called "unraveling." Instead of

J=0
LOOP
MULL R1,A(J) * B(J)
ADD R2,R2+R1
J=J+1
REPEAT the compiler would produce J=0
LOOP
MUL R1,A(J) * B(J)
ADD R2,R2+R1
MUL R3,A(J+1) * B(J+1)
ADD R4,R4+R3
MUL R5,A(J+2) * (J+2)
ADD R6,R6+R5
MUL R7,A(J+3) * B(J+3)
ADD R8,R8+R7
J=J+4
REPEAT At the end of execution of this code, the four partial sums would have to be accumulated into a single register, as in the following code:

ADD R2,R2+R4
ADD R6,R6+R8
ADD R2,R2+R6

By unraveling the loop, four multiplications and four additions are now performed in each iteration of the loop. And because each of the four multiplications uses different registers, they do not have to wait on each other. Nor do the additions have to wait on each other. Thus, if the pipelines are four stages long, one multiplication and one addition can be computed each cycle. Now, instead of 4N cycles to compute the inner product, only N are theoretically required. However, as previously mentioned, usually only one result is actually allowed to be produced each cycle in most arithmetic units. Consequently, 2N cycles are required. A mechanism is described below by which the inner product can be produced in only N cycles. Two results are produced each cycle, but one is a partial result.

FIG. 1 is a block diagram of a floating point arithmetic unit according to the present invention. The unit is comprised of an adder pipeline unit 2, a multiplier pipeline unit 4, with the output of the adder pipeline unit 2, and the multiplier pipeline unit 4 being connected via connect switches 3 and 5, respectively, to a putaway bus (PAB) 6 and thence to a register file 8. The adder pipeline unit 2 is also connected via an accumulator connect switch 11 to an accumulator bypass bus (ABB) 9 which is connected to a left adder wait station 10. The putaway bus (PAB) is directly connected to a bypass bus (BPB) 12 which is connected to the left adder wait station 10, a right adder wait station 14, a left multiplier wait station 16 and the right multiplier wait station 18.

The register file 8 is connected via a left register bus (LRB) 20 to the left adder wait station and the left multiplier wait stations 10 and 16, respectively, with a right register bus (RRB) 22 being connected to the right adder wait station and right multiplier wait stations 14 and 18, respectively. An instruction register (IR) 24 is connected via a bus 26 to the register file 8. A central processing memory unit 28 provides an input to the instruction register 24 via an instruction fetch bus (IFB) 30, and an input to the register file 8 via a register load bus (RLB) 32, and receives an input from the register file 8 via a register store bus (RSB) 34. The instruction register 24 and memory 28 are included in the overall central processing unit (CPU), not shown, and are operative with, but not part of the arithmetic unit herein described. The instruction register 24 sequentially receives instructions from the central memory 28 and executes them. As the instructions are executed, floating-point numbers are transferred between the register file 8 and memory 28, and certain operations on these numbers are initiated within the arithmetic unit. Instructions are fetched from central memory (MEM) 28 into the instruction register (IR) 24 where they are decoded. Depending on the instruction decoded, control signals are sent to the other components. The register file (REGS) 8 consists of some number of high-speed storage locations called "registers." These are designated R1 through Rn, as shown in detail in FIG. 2. Each register may be loaded with data from memory 28 over the register load bus (RLB) 32, and data in the registers may be stored into memory 28 over the register store bus (RSB) 34. Two registers may be added together by sending them to the adder pipeline unit (ADD) 2. One register travels to the adder over the left register bus (LRB) 20, and another register travels to the adder over the right register bus (RRB) 22. When the two registers have been added together, the result emerges from the adder pipeline over the adder result bus (ARB) 7. The result is a triple consisting of a value, register number, and operation type designator, or (value,reg,op). If the adder connect switch (ACS) 3 is on, the result passes from the adder result bus (ARB) 7 onto the putaway bus (PAB) 6 and the bypass bus (BPB) 12. After traveling over the putaway bus (PAB) 6, the result is stored away in a designated register of the register file (REGS) 8. After traveling over the bypass bus (BPB) 12, the result is available for reuse by other, waiting instructions in a manner to be described below. Similarly, two registers can be multiplied together by the multiplier pipeline unit 4. At any one time, only the adder connect switch (ACS) 3 or the multiplier connect switch (MCS) 5 can be active since only one result may be placed on the putaway bus (PAB) 6 each cycle. These connect switches become active depending on the op field of the output of the pipeline units.

Several instructions can be in execution at any one time in both of the pipeline units. Although instructions are entered in the order in which they are executed, they may emerge from the pipeline in any order.

Figure 2:
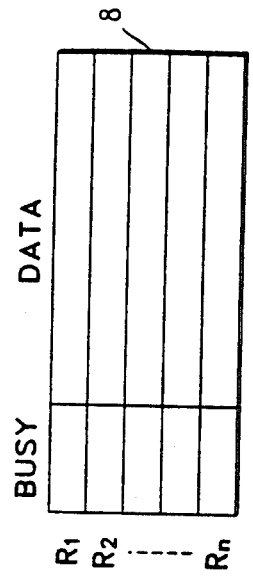
FIG. 2 is a detailed diagram of the registers illustrated generally in FIG. 1.

Each instruction is of the form, OP TR,SR1,SR2, where OP specifies which operation is to be performed, that is, add-type or multiply-type, SR1 and SR2 specify the two source registers, and TR specifies the target register, the register which is to receive the result of the operation. Each register in the register file, as shown in FIG. 2, has a format comprised of a busy bit and a data field. When an instruction is decoded with register Rn as the target register, where Rn designates any of the existing registers, the busy bit for register Rn is turned on, and the instruction is sent to one of the arithmetic pipes along with its two operands, if available. When the instruction completes, the result will return over the putaway bus (PAB) 6 and enter the specified target register, Rn. At this point, the busy bit of Rn is turned off.

During the time that the busy bit for Rn is on, no new instruction is allowed to be decoded if that instruction also specifies register Rn as the target register. This is due to the fact that instructions may complete out of order once they have been sent to the pipeline units. The busy bit allows the arithmetic unit to ensure that the results are entered into Rn in the appropriate sequence since only one instruction in execution may ever specify Rn as the target.

Figure 3:
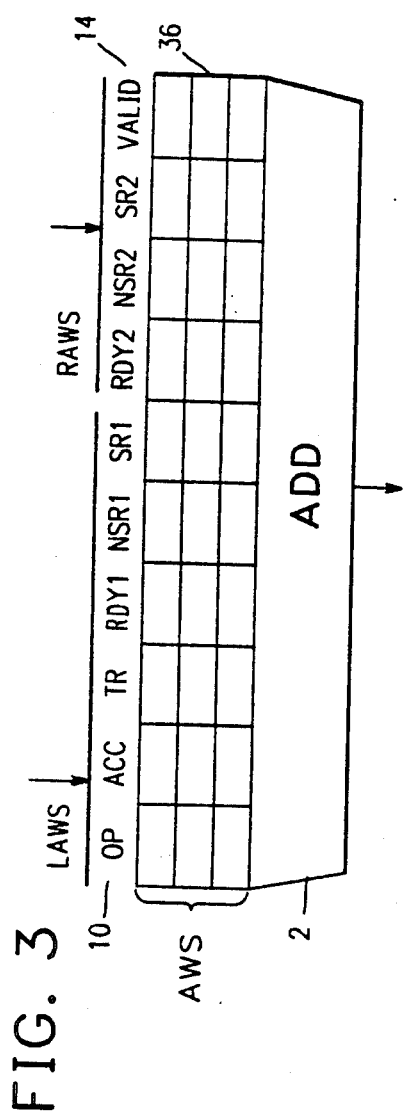
FIG. 3 is a detailed diagram of the adder unit which is shown generally in FIG. 1.

When an instruction is decoded with a target register whose busy bit is off, the two source registers are gated out of the register file. The register designated by SR1 is gated onto the left register bus (LRB) 20 and SR2 onto the right register bus (RRB) 22. Then, depending on the class of the operation, these values both go to either the adder or the multiplier wait station. Both wait stations consist of a number of wait station slots, but not necessarily the same number. With reference to FIG. 3, each slot has the format illustrated.

To enter a slot 36, the slot must be presently unoccupied. If the VALID bit of a slot is off, the slot is unoccupied; otherwise, it is occupied. Any unoccupied slot is acceptable. When a slot is selected, the VALID bit for that slot is turned on. Register SR1 enters the SR1 slot field, SR2 enters the SR2 slot field, RDY1 and RDY2 are both set on, and the TR and OP slot fields are set.

Each cycle, both pipelines scan their waiting stations for a slot with all three of the VALID, RDY1, and RDY2 bits set. Such slots contain operations ready to be executed. When one is found, the data is entered into the pipeline, and the slot's VALID bit is turned off, allowing it to be reused. Once the instruction enters the pipeline, the OP field controls which operation is performed on the data, and the TR field specifies the target register for the result.

The above description describes the actions taken when both source registers are available at the time the instruction is decoded, that is, when neither SR1 nor SR2 has its busy bit on. If either does have its busy bit on, then that register does not presently contain its correct, current value, for there is an instruction in execution that will produce a new value for that register. Instead of holding up the instruction in the decoder until both source registers become valid, the instruction is allowed to fire anyway. However, the instruction must now be marked as not yet ready to execute. If the busy bit of SR1 is on, RDY1 is set to false in the wait station; similarly, if the busy bit for SR2 is on, RDY2 is set to false. Because all three of the VALID, RDY1, and RDY2 bits must be on in a slot for that slot to be selected, slots with unready (BUSY) source registers will be delayed in the waiting station slot to which they have been assigned. If the busy bit for SR1 is on in REGS no value for SR1 is gated out onto the left register bus (LRB) and into the SR1 slot field. Instead, the register number SR1 itself is placed in the NSR1 field and RDY1 is set to false. Similarly for SR2. If RDY1 is on, SR1 holds a value; if RDY1 is off, NSR1 holds a register number.

As values exit from a pipeline, they travel over the putaway bus (PAB) 6. THey also travel over the bypass bus (BPB) 12. The bypass bus 12 is connected to every slot in both waiting stations. Each cycle, every slot that is valid but has either RDY1 or RDY2 set to false checks to see if the TR field accompanying the value on the bypass bus is the same as the number in the NSR1 or NSR2 fields. If so, then the value on the bypass bus enters the matching SR1 or SR2 slot field and the corresponding ready bit or bits are turned on. In this way, waiting, valid slots become ready, valid slots.

A special instruction of the form, ACC TR,SR2, is provided. It performs an operation similar to ADD TR,TR+SR2. However, once the ACC (accumulate) instruction enters a wait station slot, the ACC bit field of the slot is turned on. For an ACC instruction to decode, the busy bit for register TR must be off. Upon decoding, the busy bit for register TR is turned on, an empty slot in the adder pipe is selected, the slot's valid bit is turned on, the SR1 field is set to zero, RDY1 is set on, RDY2 is set off, NSR2 is set to SR2,the TR and NSR1 are fields set to TR, and the ACC bit is turned on. The slot is now ready to accumulate partial sums.

Suppose a multiply instruction is executed with the form MUL TR,SR1 * SR2 where the TR designation is the same as in NSR2 of the ACC instruction. When the result of the multiplication appears on the bypass bus (BPB) 12, the TR number matches the unready NSR2 field of the waiting accumulate instruction, and so it enters the SR2 field of the ACC slot and RDY2 is turned on. Now the ACC instruction is eligible to be selected by the adder pipeline unit for execution (since RDY1, RDY2, and VALID are now all on). When selected, however, the VALID bit is not turned off as is done for other instructions, thereby preventing the slot from being reused. However, both the RDY1 and RDY2 bits are turned off. When the accumulate instruction has finished adding its two values together, the result is placed on the accumulate bypass bus (ABB) 9.

The operation code (op) that travels through the pipe with the two register values is determined to be an accumulate operation, so the accumulate control switch (XCS) 11 is turned on by the adder pipeline unit, thereby placing the new partial sum onto the accumulate bypass bus (ABB) 9. Because this bus is separate from either the putaway bus (PAB) 6 or the bypass bus (BPB) 12, the multiplier pipeline can also produce a result during the same cycle in which an accumulation result is produced. Each cycle, waiting, valid slots in the adder waiting stations monitor the bypass bus (BPB) 12 and the accumulator bypass bus (ABB) 9. If a valid slot has RDY1 set to false and ACC set to true, then the accumulator bypass bus is monitored for the NSR1 value; otherwise the bypass bus is monitored. The SR2 value can appear on only the bypass bus and not the accumulator bypass bus.

To stop an accumulation, an instruction of the form, STAC TR,SR2, is used. STAC means "stop accumulating." To decode, the busy bit for SR2 must be off. This instruction locates the corresponding wait station slot, sets RDY2 to true, sets SR2 to zero, and turns off the ACC bit. When the instruction now fires, the VALID bit will be turned off since now the ACC bit is off. The accumulated sum will pass through the pipe and finally appear on the putaway bus, from where it will enter the target register in the register file. Because the op specifies a STAC instruction instead of an ACC instruction, the adder connect switch (ACS) 3 is activated instead of the accumulate connect switch (XCS) 11.

The unraveled loop described before could now be recoded as follows:

```
ACC R2,R1
ACC R4,R3
ACC R6,R5
ACC R8,R7
J=0
LOOP
MUL R1,A(J) * B(J)
MUL R3,A(J+1)
MUL R5,A(J+2) * B(J+2)
MUL R7,A(J+3) * B(J+3)
J=J+4
REPEAT
STAC R2,R1
STAC R4,R3
STAC R6,R5
STAC R8,R7
ADD R2,R2+R4
ADD R6,R6+R8
ADD R2,R2+R6
```

Now only multiplication instructions appear within the inner loop, no additions. Consequently, one multiplication instruction can be decoded every cycle. Because multiplication results will appear on the putaway bus (PAB) 6 and the bypass bus (BPB) 12 and accumulations will appear on the accumulator bypass bus (ABB) 9, both the adder and multiplier can produce a result each cycle, Consequently, to form an inner product of two N-element vectors, only N cycles are required. No special vector unit is required.

INDUSTRIAL APPLICABILITY

It is an object of the invention to provide an improved floating point arithmetic unit.

It is another object of the invention to provide an improved floating point arithmetic unit which can produce two arithmetic results per cycle of operation.

It is yet another object of the invention to provide an improved floating point arithmetic unit which can produce two arithmetic results per cycle of operation, one of which can be accumulated under distributed control of the accumulator logic itself, to accomplish vector and matrix related arithmetic operations.

Having thus described my invention, what I claim as new, and desire to secure by Letters Patent is:

1. In an arithmetic unit for performing vector and matrix related arithmetic operations in response to arithmetic instructions for producing two arithmetic results per cycle of operation, the first of which is the result of a multiply type operation, and the second of which is the result of an accumulate type of operation, the combination comprising:
   an adder for performing an add type operation, said adder including an accumulating register for accumulating partial arithmetic results;
   a multiplier for performing a multiply type operation; and
   means for accumulating partial arithmetic results into said accumulating register of said adder concurrent with obtaining the results of a multiply type operation from said multiplier, during a given cycle of operation.

2. The combination claimed in claim 1, wherein said arithmetic instructions comprise an inner loop of instructions and an outer loop of instructions, wherein only multiply type instructions appear within the inner loop of instructions, including means for executing said inner loop of instructions and said outer loop of instructions concurrently.

3. The combination claimed in claim 2, wherein:
   said adder has first and second inputs and an output, including a first switch connected to said output, with said switch being on when an add type operation is being completed, with said first switch being off at all other times;
   said multiplier has first and second inputs and an output, including a second switch connected to said output, with said second switch being on when a multiply type operation is being completed, with said first and second switches not being both on at the same time; and further including
   an accumulator bypass bus connected to said first input of said adder, including a third switch connected to said accumulator bypass bus and connected to said output of said adder, with said third switch being on when an accumulate type operation is being completed, with said third switch being off at all other times;
   a bypass bus connected to said first and second switches and to the first and second inputs of each of said adder and multiplier for receiving the results of an adder type or multiplier type operation, dependent upon whether or not said first or second switch is on;
   a putaway bus connected to said first and second switches for receiving the results of an adder type or multiplier type operation, dependent upon whether or not said first or second switch is on;
   a register file having an input connected to said putaway bus for receiving the results of an adder type or multiplier type operation dependent upon whether or not said first or second switch is on, with said register file having a first output connected to the respective first inputs of said adder and multiplier, and said register file having a second output connected to the respective second inputs of said adder and multiplier.

4. In an arithmetic unit for performing vector and matrix related arithmetic operations for producing two arithmetic results per cycle of operation, one of which is the result of an accumulate type operation, the combination:

an adder having first and second inputs and an output, including a first switch connected to said output, with said first switch being on when an add type operation is being completed, with said first switch being off at all other times;

a multiplier having first and second inputs and an output, including a second switch connected to said output, with said second switch being on when a multiply type operation is being completed, with said second switch being off at all other times;

an accumulator bypass bus connected to said first input of said adder, including a third switch connected to said accumulator bypass bus and connected to said output of said adder, with said third switch being on when an accumulate type operation is being completed, with said third switch being off at all other times, and with said second and third switches being permitted to be concurrently on such that two arithmetic results may be concurrently produced, one of which is the result of an accumulate type operation;

a putaway bus connected to said first and second switches for receiving the results of an adder type or multiplier type operation, dependent upon whether or not said first or second switch is on;

a bypass bus connected to said first and second switches and to the first and second inputs of each of said adder and multiplier for receiving the results of an adder type or multiplier type operation, dependent upon whether or not said first or second switch is on; and a register file having an input connected to said putaway bus for receiving the results of an adder type or multiplier type operation dependent upon whether or not said first or second switch is on, with said register file having a first output connected to the respective first inputs of said adder and multiplier, and said register file having a second output connected to the respective second inputs of said adder and mutliplier.

5. The combination claimed in claim 4, wherein said arithmetic operations are accomplished in response to arithmetic instructions comprised of an inner loop of instructions and an outer loop of instructions, wherein only multiply type instructions appear within the inner loop of instructions, including means for executing said inner loop of instructions and said outer loop of instructions concurrently.

6. In an arithmetic unit for performing vector and matrix related arithmetic operations in response to arithmetic instructions comprised of an inner loop of instructions and an outer loop of instructions, wherein only multiply type instructions appear within the inner loop for producing two arithmetic results per cycle of operation, one of which is the result of an accumulate type operation and the other of which is the result of a multiply type operation, the combination comprising:

an adder having a left adder wait station and a right adder wait station, and including an adder output, including a first switch connected to said adder output, with said first switch being on when an add type operation is being completed, with said first switch being off at all other times;

a multiplier having a left multiplier wait station and a right multiplier wait station, and including a multiplier output, including a second switch connected to said multiplier output, with said second switch being on when a multiply type operation is being completed, with said second switch being off at all other times, with said first and second switches not permitted to be both on at the same time;

an accumulator bypass bus connected to said left adder wait station, including a third switch connected to said accumulator bypass bus and connected to said adder output, with said third switch being on when an accumulate type operation is being completed, with said third switch being off at all other times, with said second and third switches being permitted to both be on at the same time;

a putaway bus connected to said first and second switches for receiving the results of an adder type or multiplier type operation, dependent upon whether or not said first or second switch is on;

a bypass bus connected to said first and second switches and to respective left and right wait stations of each of said adder and multiplier for receiving the results of an adder type of multiplier type operation, dependent upon whether or not said first or second switch is on; and a register file having an input connected to said putaway bus for receiving the results of an adder type or multiplier type operation dependent upon whether or not said first or second switch is on, with said register file having a first output connected to the respective first wait stations of said adder and multiplier, and said register file having a second output connected to the respective second wait stations of said adder and multiplier.

7. The combination claimed in claim 6, wherein said adder and multiplier wait stations each include n registers, where n is an integer, with each of said n registers each including at least an op field indicative of the arithmetic operation to be performed, a TR field indicative of a target register in said register file, a SR1 field containing the value of a first source register in said register file and a SR2 field containing the value of a second source register in said register file, an NSR1 and NSR2 field containing the register number for source register one and source register two, respectively, and a RDY1 and RDY2 field which are indicative of whether the SR1 and SR2 fields respectively are occupied, with said adder wait station including an ACC field which is indicative of whether or not an accumulate operation is to be performed, and a V bit to indicate if the data in the register is valid.

8. In an arithmetic unit for performing vector or matrix related arithmetic operations in response to arithmetic instructions comprised of an inner loop of multiply type instructions and an outer loop of add or accumulate type instructions for producing two arithmetic results per cycle of operation, the first of which is the result of a multiply type operation, and the second of which is the result of an accumulate type operation, the combination comprising:

an adder for performing add type operations, said adder including an accumulating register for accumulating partial arithmetic results of an accumulate type operation;

a multiplier for performing multiply type operations; and means for concurrently executing said inner loop of instructions and said outer loop of instructions for producing an accumulate result from said adder and a multiply result from said multiplier in a given cycle of operation.

9. The combination claimed in claim 8, including:
means for storing said accumulate result in said accumulating register of said adder.

* * * * *